Apr. 3, 1923.  
W. M. SILLIMAN  
1,450,310  
LINING FOR CONDUIT OUTLET BOXES  
Filed Oct. 17, 1918    2 sheets-sheet 1

INVENTOR  
William M. Silliman  
BY  
Garms & Bodell.  
ATTORNEYS

Apr. 3, 1923.
W. M. SILLIMAN
1,450,310
LINING FOR CONDUIT OUTLET BOXES
Filed Oct. 17, 1918    2 sheets-sheet 2
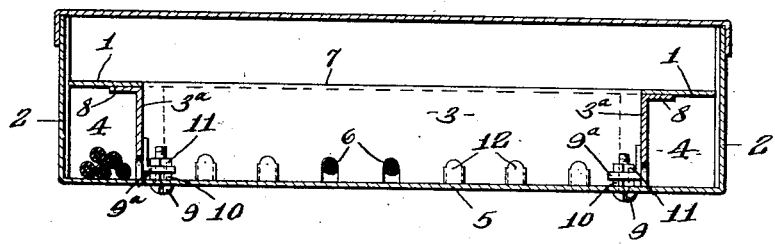
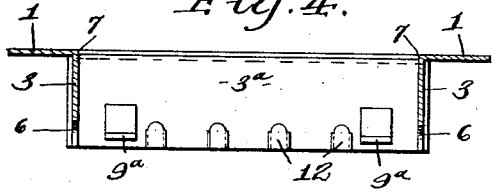
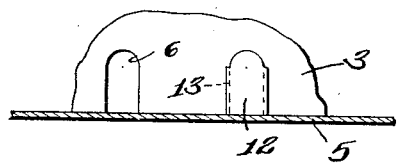
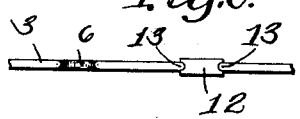
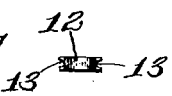
INVENTOR
William M. Silliman
BY
Parsons & Bodell
ATTORNEYS Patented Apr. 3, 1923.

1,450,310

UNITED STATES PATENT OFFICE.

WILLIAM M. SILLIMAN, OF SYRACUSE, NEW YORK.

LINING FOR CONDUIT OUTLET BOXES.

Application filed October 17, 1918. Serial No. 258,586.

*To all whom it may concern:*

Be it known that I, WILLIAM M. SILLIMAN, a citizen of the United States, residing at Syracuse, in the county of Onondaga and State of New York, have invented a certain new and useful Lining for Conduit Outlet Boxes, of which the following is a specification.

This invention relates to electrical boxes as conduit outlet boxes or cabinets and has for its object a particularly simple and efficient lining or trim which can be inserted as a unit in the box and which separates the compartment of the box in which the electrical appliances as fuse blocks are located from the compartment or gutter in which service wires are located, which lining is particularly simple in construction, readily placeable in position and highly efficient and durable in use. The invention consists in the novel features and in the combinations and constructions hereinafter set forth and claimed.

In describing this invention, reference being had to the accompanying drawings in which like characters designate corresponding parts in all the views.

Figure 3 is a transverse sectional view through a box provided with my invention.

Figure 4 is a sectional view through the lining unit taken at a right angle to the section of said unit in Fig. 3.

Figure 5 is an enlarged fragmentary view illustrating the wire openings or notches of the unit and the closures therefor.

Figure 6 is an edge view of one of the walls of the unit provided with wire openings, one of the closures for the opening being removed.

Figures 7 and 8 are respectively, a plan and an edge view of the closure for the wire opening.

Figure 1:
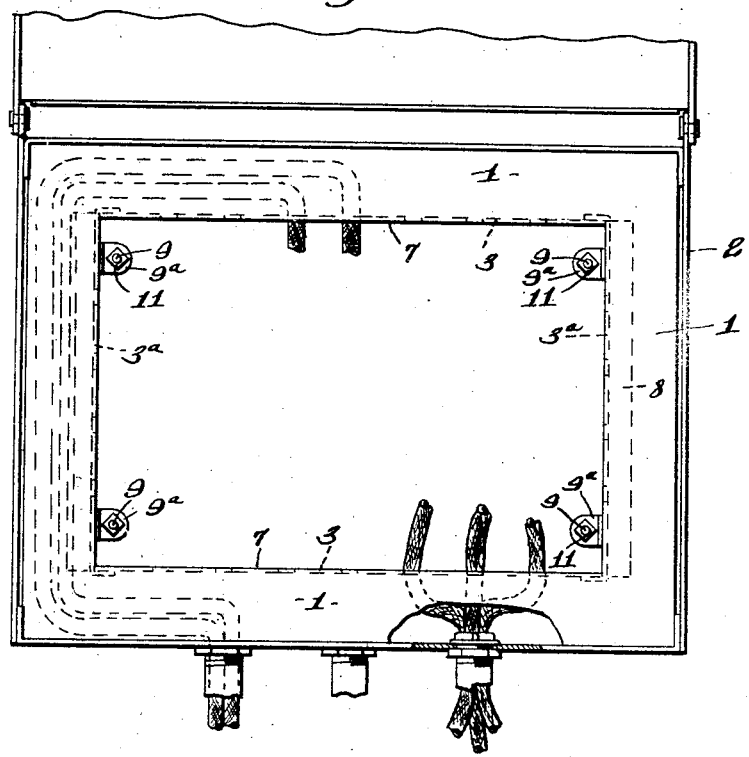
Figure 1 is a plan view, partly broken away, of my lining applied to a conduit outlet box, the cover of the box being shown as open and as partly broken away.
Figure 2:
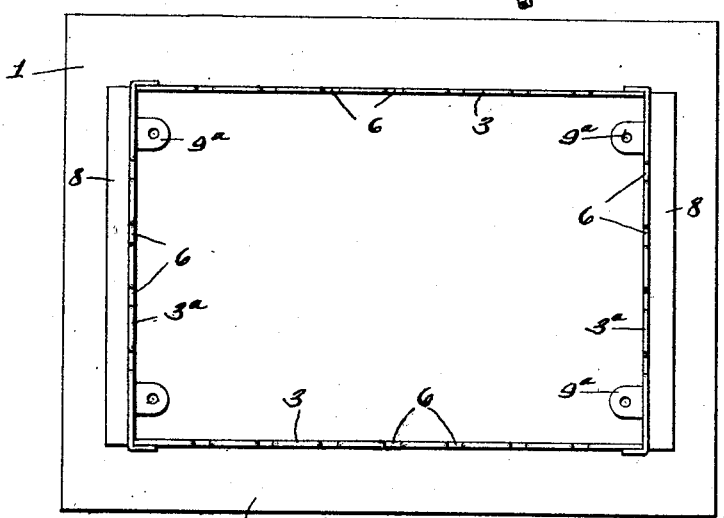
Figure 2 is an inverted plan view of the lining unit.

This unit comprises generally, a marginal horizontal top wall or plate 1 of substantially the same outline and size as the interior of the cabinet 2 and meeting the inner faces of the side walls of the cabinet and vertical walls 3, 3ª depending from the top wall or plate 1 and spaced apart from the inner faces of the side walls to form a gutter 4, the lower edges of the walls 3, 3ª meeting the bottom 5 of the cabinet, the walls 3, 3ª being formed with wire openings or notches 6 in their lower edges through which the service wires pass from the gutter 4 to the electrical appliance mounted on the bottom of the box within the space confined by the walls 3, 3ª.

The lining unit is formed from a rectangular sheet metal blank formed with a rectangular opening extending over a greater part of the area thereof leaving a marginal flange portion constituting the top plate 1; the opposing walls 3 are integral portions of the sheet metal plate bent inwardly and downwardly at 7. The walls 3ª are strips of sheet metal formed with horizontal flanges 8 at their upper edges which lap the inner margin of the plate or flange 1, the flanges 8 being secured to the plate 1 in any suitable manner as by welding.

The lining unit is secured in position in any suitable manner and as here shown, it is secured to the bottom 5 of the box by means of screws 9 extending through the bottom and through lugs 9ª projecting inwardly from the lower portions of the walls 3ª. The lugs 9ª are spaced apart from the bottom 5 and usually spacing nut 10 is inserted between the lugs and the bottom 5. Nuts 11 turn on the screws 9 against the upper faces of the lugs. Any other suitable means may be employed to hold the unit in position.

The wire openings 6 preferably open through the lower edge of the walls 3 and 3ª and those not occupied by wires are covered by closures 12 provided with grooves or ways 13 in their side edges, the closures sliding into the notches 6 with the margins of the side walls of the notches located in the grooves 13.

In use, electrical appliances as fuse blocks and the like are mounted on the bottom of the box within the space confined by the walls 3 and 3ª and are accessible when the cover of the box is open. The boxes or cabinets 2 are made in different standard sizes and my lining units are made to conform to various sizes and can be readily inserted in the box, and when in position effectively separate the service wires from the compartment containing the fuse block or other electrical appliance.

What I claim is:

1. A lining for conduit outlet cabinets comprising a body in the form of a sheet having a rectangular opening, the portions of said sheet at opposite sides of the opening being bent downwardly at a right angle to the plane of the sheet, forming flanges constituting two opposing side walls of the lining, and depending flanges separate from the sheet and attached to the inner edges of the sheet at the remaining two sides of said opening, the flanges forming the sides of the lining, substantially as and for the purpose specified.

2. A lining for conduit outlet cabinets comprising a body in the form of a sheet having a rectangular opening, the portions of said sheet at opposite sides of the opening being bent downwardly at a right angle to the plane of the sheet forming flanges constituting two opposing side walls of the lining, and flanges attached to the inner edges of the sheet at the remaining two sides of said opening, the flanges being formed with cutouts for wires at their lower edges substantially as and for the purpose set forth.

3. The combination with a cabinet for receiving electric appliances, of a lining therefor comprising a unit insertable in the cabinet and including upright walls spaced apart and parallel to the inner faces of the side walls of the cabinet and meeting the bottom thereof forming a gutter around the margin of the bottom of the box, and a horizontal flange extending from the upper edges of said walls and meeting the inner faces of the side walls of the cabinet and means on the upright walls on the sides thereof exposed in the opening enclosed by the unit for securing the unit in the cabinet, substantially as and for the purpose describe.

In testimony whereof, I have hereunto signed my name, at Syracuse, in the county of Onondaga, and State of New York, this 25th day of September, 1918.

WILLIAM M. SILLIMAN.